US007461928B2

(12) United States Patent
Perez et al.

(10) Patent No.: US 7,461,928 B2
(45) Date of Patent: Dec. 9, 2008

(54) FLUID-DELIVERY MECHANISM FOR FLUID-EJECTION DEVICE

(75) Inventors: Raul Perez, San Marcos, CA (US); Antoni Murcia, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 219 days.

(21) Appl. No.: 11/043,519

(22) Filed: Jan. 26, 2005

(65) Prior Publication Data

US 2006/0164474 A1 Jul. 27, 2006

(51) Int. Cl.
*B41J 2/175* (2006.01)
*B41J 2/17* (2006.01)
*F16M 11/00* (2006.01)

(52) U.S. Cl. ............................ 347/85; 347/84; 248/674

(58) Field of Classification Search .................. 347/85, 347/86, 84; 248/674
See application file for complete search history.

(56) References Cited

U.S. PATENT DOCUMENTS 5,369,429 A * 11/1994 Erickson ........................ 347/7
5,936,650 A 8/1999 Ouchida et al.
6,068,370 A 5/2000 Miller et al.
6,082,854 A 7/2000 Axtell et al.
6,106,109 A * 8/2000 Olazabal et al. ............... 347/85
6,120,132 A 9/2000 Coiner et al.
6,130,695 A 10/2000 Childers et al.
6,206,510 B1 3/2001 Casserino et al.
6,273,560 B1 8/2001 Keefe et al.
6,290,343 B1 9/2001 Lewis et al.
6,387,184 B1 * 5/2002 Gibson et al. ............... 118/323
6,481,836 B1 * 11/2002 Paroff et al. .................. 347/85
2002/0047881 A1 4/2002 Lewis et al.
2002/0057319 A1 * 5/2002 Saruta et al. .................. 347/86
2002/0149646 A1 * 10/2002 Pawlowski et al. ............ 347/50
2003/0007040 A1 1/2003 Love et al.
2003/0076390 A1 * 4/2003 Sturgeon et al. .............. 347/86
2003/0076391 A1 * 4/2003 Wilson et al. ................. 347/86
2003/0142176 A1 7/2003 Wu et al.
2004/0021746 A1 2/2004 Sole et al.

FOREIGN PATENT DOCUMENTS

EP 0 863 013 A2 9/1998
EP 0903238 A2 3/1999
EP 0 925 937 B1 6/1999

OTHER PUBLICATIONS

International Search Report for Application No. PCT/US2006/003009. Report issued Jul. 7, 2006.

* cited by examiner

*Primary Examiner*—Stephen D Meier
*Assistant Examiner*—Sarah Al-Hashimi

(57) ABSTRACT

A fluid-delivery mechanism for a fluid-ejection device includes a fluid-supply station and a bracket that is fluidly and removably connectable between the fluid-supply station and one or more fluid-ejection printheads that are insertable into and controllable by the fluid-ejection device. The bracket supplies fluid from the fluid-supply station to the fluid-ejection printheads.

8 Claims, 10 Drawing Sheets

FLUID-DELIVERY MECHANISM FOR FLUID-EJECTION DEVICE

BACKGROUND

Inkjet printers are fluid-ejection devices that form images, such as graphics, text, and the like, on media by ejecting ink or another fluid on the media. While such printers are common in home and office environments, large-scale inkjet printers are becoming common in more industrial or commercial applications. Large-scale inkjet printers are typically designed to operate hours or even days at a time without user interaction, to complete large print jobs. For example, printing the address label on millions of magazines to be sent to subscribers is one type of application that is commonly used with large-scale inkjet printers.

Some types of large-scale inkjet printers can print with only one color of ink at a time. If the same inkjet printer is then needed to be used to print with a different color of ink, a time-consuming and user-involving cleaning or flushing process may have to be undertaken to completely remove the old color of ink so that the old color of ink does not contaminate image formation on media using the new color of ink. In particular, all the components of the inkjet printer that come into contact with ink, which are referred to as the "wet components" of the printer, may have to be cleaned or flushed before using the new color of ink. For this and other reasons, there is a need for the present invention.

BRIEF DESCRIPTION OF THE DRAWINGS

The drawings referenced herein form a part of the specification. Features shown in the drawing are meant as illustrative of only some embodiments of the invention, and not of all embodiments of the invention.

DETAILED DESCRIPTION OF THE DRAWINGS

In the following detailed description of exemplary embodiments of the invention, reference is made to the accompanying drawings that form a part thereof, and in which is shown by way of illustration specific exemplary embodiments in which the invention may be practiced. These embodiments are described in sufficient detail to enable those skilled in the art to practice the invention. Other embodiments may be utilized, and logical, mechanical, electrical, electro-optical, software/firmware and other changes may be made without departing from the spirit or scope of the present invention. The following detailed description is, therefore, not to be taken in a limiting sense, and the scope of the present invention is defined only by the appended claims.

Figure 1:
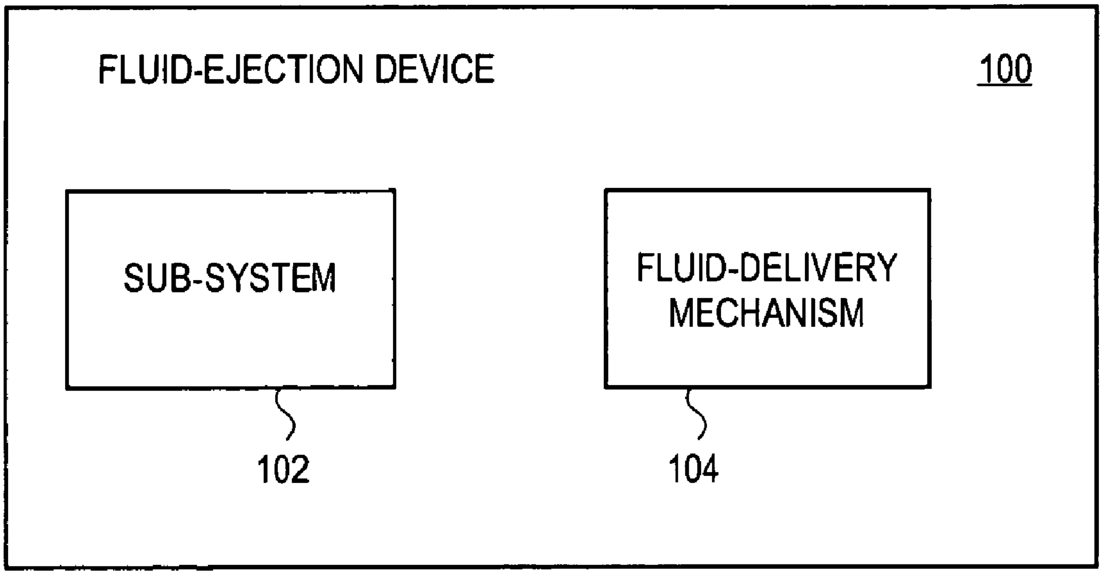
FIG. 1 is a rudimentary block diagram of a fluid-ejection device having a fluid-delivery mechanism encompassing all components that come into contact with fluid during image formation on media, according to an embodiment of the invention.

FIG. 1 shows a rudimentary block diagram of a fluid-ejection device 100, according to an embodiment of the invention. The fluid-ejection device 100 may particularly be an inkjet-printing device, such as an inkjet printer, which ejects ink onto media to form images on the media, such as text, graphics and the like. The fluid-ejection device 100 includes a sub-system 102 and a fluid-delivery mechanism 104.

The sub-system 102 supports image formation on media via fluid ejection from the fluid-delivery mechanism 104, which is removably connectable to the sub-system 102. The fluid-delivery mechanism 104 delivers fluid to one or more separable fluid-ejection printheads therein, not shown in FIG. 1, for image formation on the media. Particularly, the fluid-delivery mechanism 104 includes or encompasses all the components of the fluid-ejection device 100 that come into contact with fluid, such as ink, during image formation on the media. The sub-system 102 may include functionality such as holding the printheads, handling media, receiving printing instructions, and controllably signaling the fluid-delivery mechanism 104 based on the printing instructions to form an image on the media.

Figure 2:
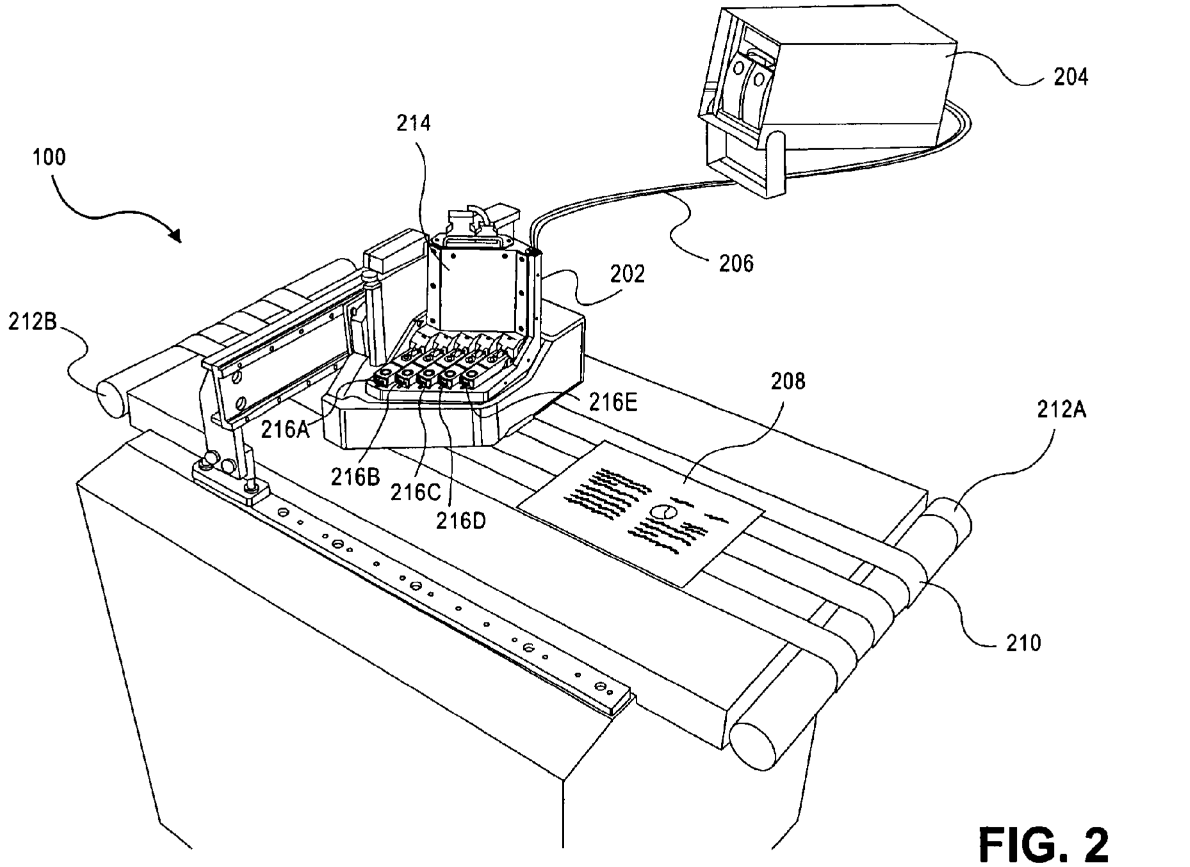
FIG. 2 is a diagram of a particular implementation of the fluid-ejection device of FIG. 1, in which the fluid-delivery mechanism includes a fluid-supply station and a bracket, according to an embodiment of the invention.

FIG. 2 shows a particular implementation of the fluid-ejection device 100, according to an embodiment of the invention. The sub-system 102 of FIG. 1 may be considered to include belts 210, rollers 212A and 212B, an image-formation mechanism 214, and other components of the device 100 that do not come into contact with fluid during image formation on the media 208. The rollers 212A and 212B rotate to move the belts 210 underneath the image-formation mechanism 214. The belts 210 have sufficient friction to move the media 208 underneath the image-formation mechanism 214. The image-formation mechanism 214 interfaces with a host device, such as a computing device, in one embodiment to receive image data and to cause a corresponding image to be formed on the media 208.

The fluid-delivery mechanism 104 of FIG. 1 may be considered to include a bracket 202, a fluid-supply station 204, conduits 206, and separable fluid-ejection printheads 216A, 216B, 216C, 216D, and 216E, which are collectively referred to as the separable fluid-ejection printheads 216. The fluid-ejection printheads 216 are inserted into the image-formation mechanism 214, but the portions of the printheads 216 from which fluid is ejected come into contact with the bracket 202, as is described in more detail later in the detailed description. The fluid-supply station 204 supplies fluid, such as ink, to the fluid-ejection printheads 216 via the bracket 202 through the conduits 206 that fluidly connect the bracket 202 to the fluid-supply station 204. The conduits 206 may also include electrical connections to provide electrical power to the fluid-supply station 204. The fluid-supply station 204 is in one embodiment situated external to other components of the fluid-ejection device 100.

The fluid-ejection printheads 216 are separable printheads in that they may be independently inserted into and removed from the image-formation mechanism 214. The image-formation mechanism 214 is in one embodiment stationary, and does not move in the same direction as the media 208 nor in a perpendicular direction to the direction of movement of the media 208. Each of the printheads 216 as such may be responsible for ejecting fluid onto a different portion of the media 208 as the media 208 is advanced under the image-formation mechanism 214. The printheads 216 are configured in a staggered formation so that one of the printheads 216 is positioned over each portion of the media 208 that is to receive ejected fluid. In this example, all of the printheads 216 inserted into the image-formation mechanism 214 receive the same color ink, from the fluid-supply station 204 via the bracket 202.

The fluid-delivery mechanism 104 of FIG. 1, including the bracket 202, the fluid-supply station 204, the conduit 206, and the separable fluid-ejection printheads 216 of FIG. 2, provides for relatively easy changing of the type of fluid that the image-formation mechanism 214 uses to form images on the media 208. For example, the fluid-ejection printheads 216 can be removed from the image-formation mechanism 214 and from the bracket 202. The bracket 202 can be disconnected from the image-formation mechanism 214. Another bracket, fluidly connected to another fluid-supply station providing a different type of fluid, such as a different color of ink, may then be connected to the mechanism 214. Different printheads, or the same printheads 216 after cleaning, may be inserted into the mechanism 214. The image-formation mechanism 214 is then ready to form images on media using a different type of fluid.

Figure 3:
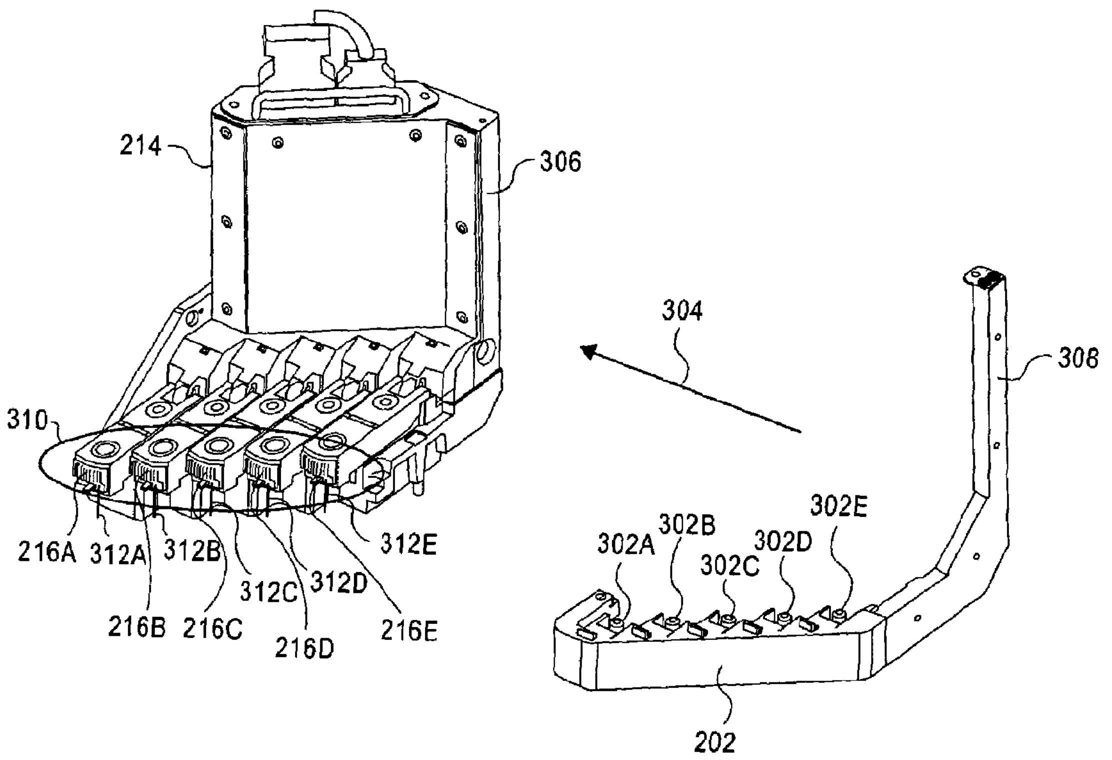
FIG. 3 is a diagram of the bracket of FIG. 2 in more detail, in which the bracket has been removed from a sub-system in which separable fluid-ejection printheads have been inserted and that are specifically part of the fluid-delivery mechanism, according to an embodiment of the invention.
Figure 4:
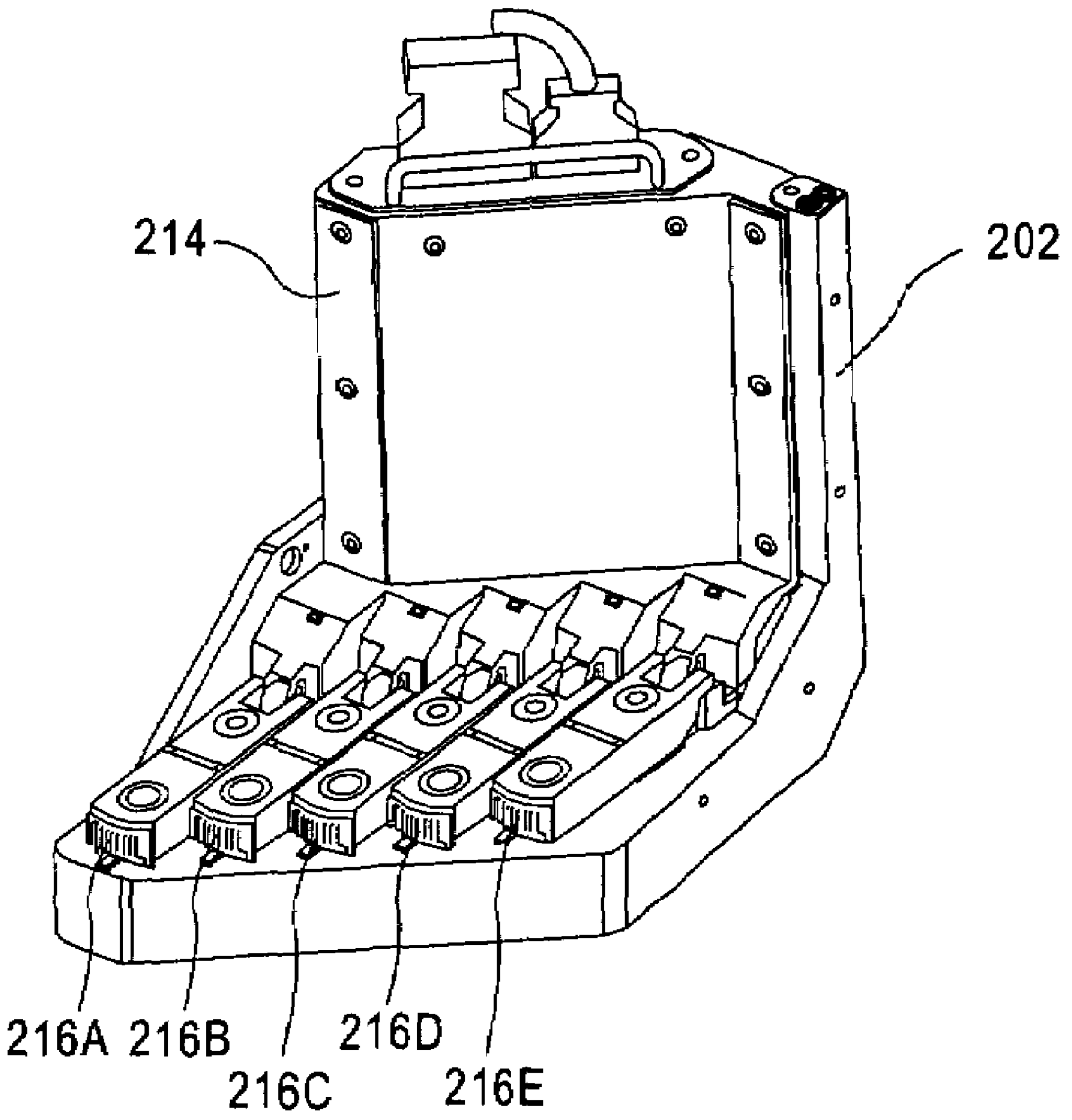
FIG. 4 is a diagram of the bracket of FIG. 2 in more detail, in which the bracket has been connected to the mechanism in which separable fluid-ejection printheads have been inserted and that are specifically part of the fluid-delivery mechanism, according to an embodiment of the invention.

FIGS. 3 and 4 show how the bracket 202 is removably connectable to the image-formation mechanism 214, according to an embodiment of the invention. In FIG. 3, the bracket 202 has been removed from the image-formation mechanism 214, and is removably connectable to the image-formation mechanism 214 as indicated by the arrow 304. In FIG. 4, the bracket 202 has been attached to the image-formation mechanism 214.

As specifically depicted in FIG. 3, the bracket 202 includes a vertical portion 308 that snaps or otherwise provides for removable affixation to a corresponding surface 306 of the image-formation mechanism 214. The fluid-ejection printheads 216 are depicted as having already been inserted into the image-formation mechanism 214. The image-formation mechanism 214 controls fluid ejection by the fluid-ejection printheads 216. The parts 310 of the fluid-ejection printheads 216 from which fluid is ejected come into contact with the bracket 202, and not with the image-formation mechanism 214, in the sense that the image-formation mechanism 214 does not come into contact with the fluid ejected by the parts 310. That is, whereas the image-formation mechanism 214 does come into contact with the printheads 216, the mechanism 214 does not come into contact with the fluid ejected by the printheads 216. Therefore, the mechanism 214 does not come into contact with the parts 310 of the printheads 216, which are the parts from which fluid is ejected, to ensure that the mechanism 214 does not come into contact with the fluid ejected by the printheads 216. As such, the printheads 216 are part of the fluid-delivery mechanism 104 of FIG. 1 in one embodiment.

The bracket 202 includes septa 302A, 302B, 302C, 302D, and 302E, collectively referred to as septa 302A. Each septum corresponds to one of the printheads 216. The printheads 216 include hollow needles 312A, 312B, 312C, 312D, and 312E, collectively referred to as the needles 312, and which are depicted in exaggerated manner in FIG. 3 for illustrative clarity. Each septum is receptive a corresponding needle of one of the printheads 216. When the bracket 202 is mounted or affixed to the image-formation mechanism 214, the needles 312 of the printheads 216 insert into the septa 302 of the bracket 202. In this way, a fluidic connection is established between the printheads 216 and the bracket 202. Fluid provided to the bracket by the fluid-supply station 202 of FIG. 2 thus reaches the printheads 216, which eject the fluid to form images on the media 208 of FIG. 2, as controlled by the image-formation mechanism 214.

Figure 5:
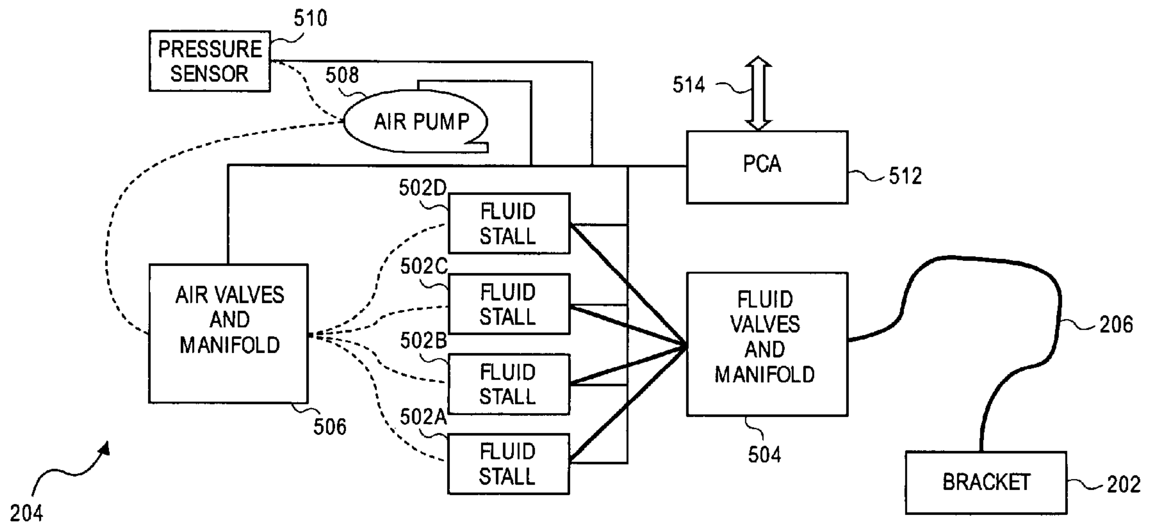
FIG. 5 is a block diagram of the fluid-supply station of FIG. 2 in more detail, according to an embodiment of the invention.

FIG. 5 shows a block diagram of the fluid-supply station 204 in more detail, according to an embodiment of the invention. Fluid stalls 502A, 502B, 502C, and 502D, collectively referred to as the fluid stalls 502, receive supplies of fluid. The fluid is provided from the fluid stalls 502 through fluid valves and manifold 504, to the bracket 202 via the conduits 206. The fluid is forced from the fluid stalls 502 via air pumped by the air pump 508 through the air valves and manifold 506 into the fluid stalls 502. A pressure sensor 510 is coupled to the air pump 508 and the air valves and manifold 506 to ensure that the proper pressure for such fluid delivery occurs. A printed circuit assembly 512 controls the air pump 508, the air valves and manifold 506, and the fluid valves and manifold 504, and monitors the pressure reported by the pressure sensor 510 as well as the levels of fluid within the fluid stalls 502. The printed circuit assembly 512 is externally controllable via an external interface or connector 514.

Figure 6:
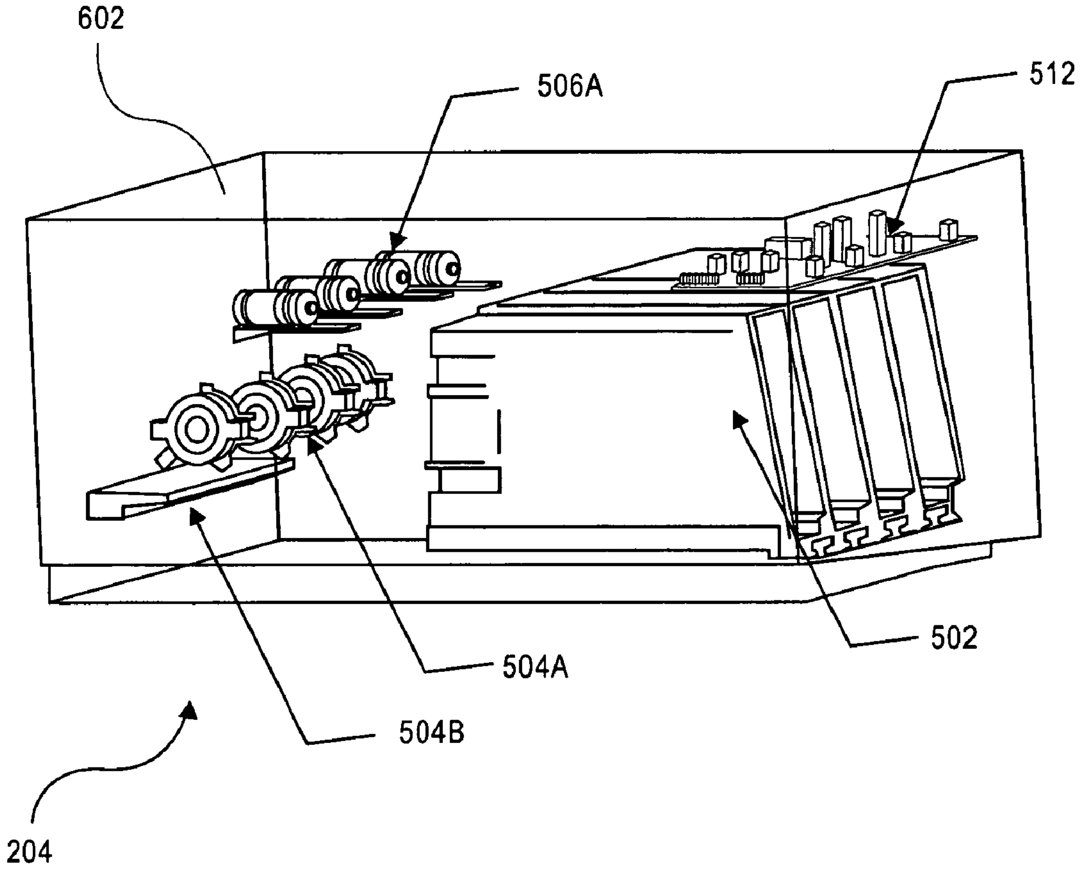
FIG. 6 is a diagram of some components of a fluid-supply station of FIGS. 2 and 5, depicting how these components are situated within an enclosure, according to an embodiment of the invention.

FIG. 6 shows the physical configuration of some of the components of the fluid-supply station 204 in detail, according to an embodiment of the invention. An enclosure 602 houses all of the components of the fluid-supply station 204, and is part of the station 204. The enclosure 602 is separate from the bracket 202 and the image-formation mechanism 214. Fluid stalls 502, fluid valves 504A, a fluid manifold 504B, air valves 506A, and the printed circuit assembly 512 of the fluid-supply station 204 are particularly depicted in FIG. 6. The other components of the fluid-supply station 204 are not depicted in FIG. 6 for illustrative clarity. The printed circuit assembly 512 is located near the top of the enclosure 602, so if fluid accidentally leaks within the enclosure 602, any sensitive electrical components of the assembly 512 are less apt to become contaminated with fluid.

Figure 7:
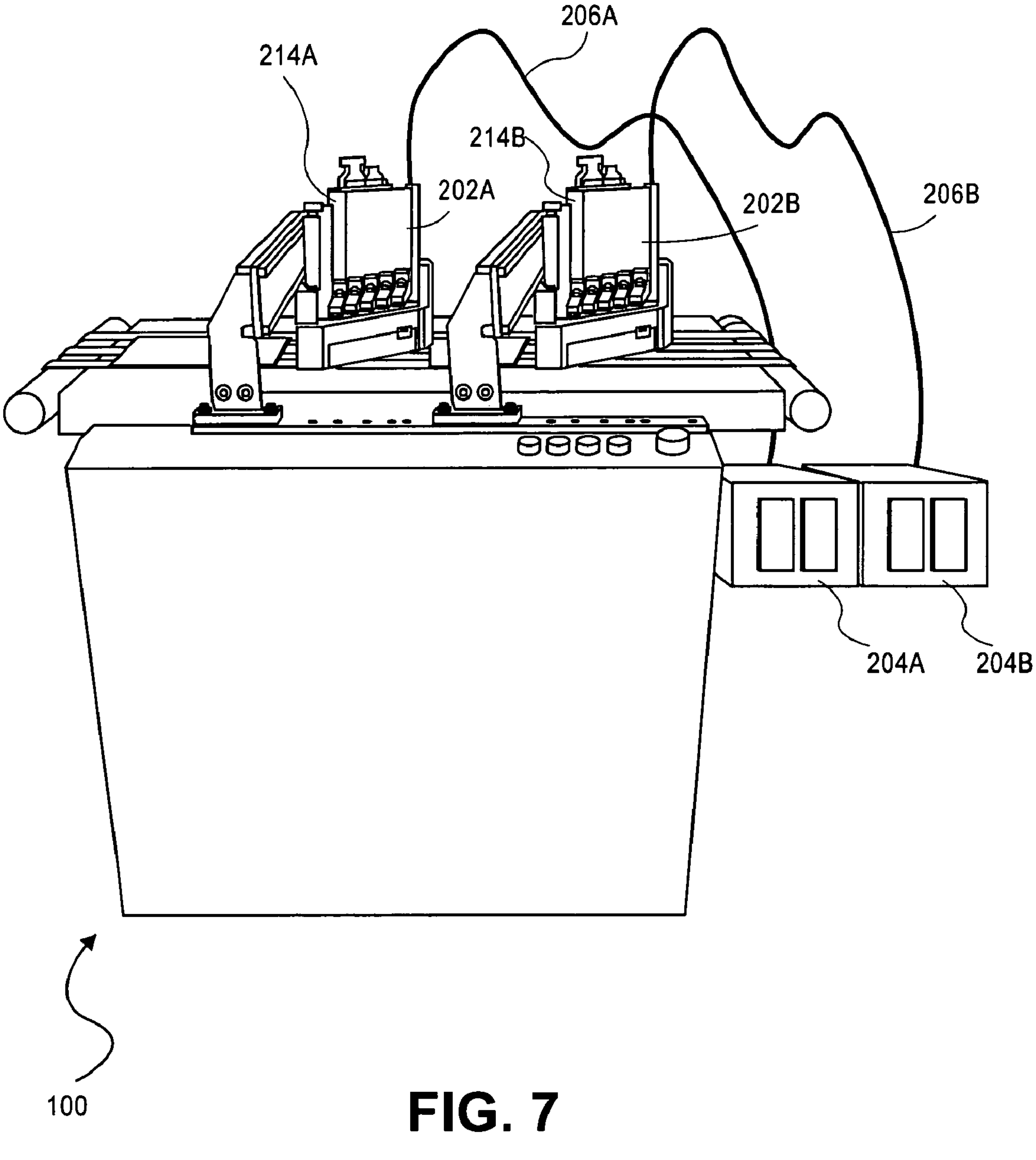
FIG. 7 is a diagram of a particular implementation of the fluid-ejection device of FIG. 1, in which there are two mechanisms for image-formation and two fluid-delivery mechanisms, according to an embodiment of the invention.

FIG. 7 shows another particular implementation of the fluid-ejection device 100, according to an embodiment of the invention. The fluid-ejection device 100 of FIG. 7 includes two image-formation mechanisms 214A and 214B, and two fluid-delivery mechanisms. The first fluid-delivery mechanism includes the bracket 202A, the fluid-supply station 204A, and the conduit 206A. The second fluid-delivery mechanism includes the bracket 202B, the fluid-supply station 204B, and the conduit 206B. The brackets 202A and 202B, the fluid-supply stations 204A and 204B, and the conduits 206A and 206B operate as has already been described in relation to the singular bracket 202, the singular fluid-supply station 204, and the singular conduits 206.

In one embodiment, the types of fluids provided by the fluid-supply stations 204A and 204B differ. For instance, the fluid provided by the fluid-supply station 204A may be one color of ink, whereas the fluid provided by the fluid-supply station 204B may be another color of ink. Having two image-formation mechanisms 214A and 214B allows for two different types of fluid to be employed when forming images on media.

In another embodiment, just the image-formation mechanism 214A may be present, such that the image-formation mechanism 214B may be absent. However, the two fluid-supply stations 204A and 204B, the two brackets 202A and 202B, and the two conduits 206A and 206B may still be present. The image-formation mechanism 214A may thus be interchangeably connected between these two fluid-delivery mechanisms, without contamination when switching between the two mechanisms.

For instance, the bracket 202A may be removed from the image-formation mechanism 214A and substituted with the bracket 202B so that the type of fluid provided by the fluid-supply station 204B can be used instead of the type of fluid provided by the fluid-supply station 204A. In such an example, the fluid-ejection printheads inserted into the image-formation mechanism 214A are cleaned or replaced with different printheads after removing the bracket 202A. Because the image-formation mechanism 214A does not come into contact with fluid during image formation, it is not contaminated with the type of fluid supplied by the fluid-supply station 204A when switching to the type of fluid supplied by the fluid-supply station 204B.

Figure 8:
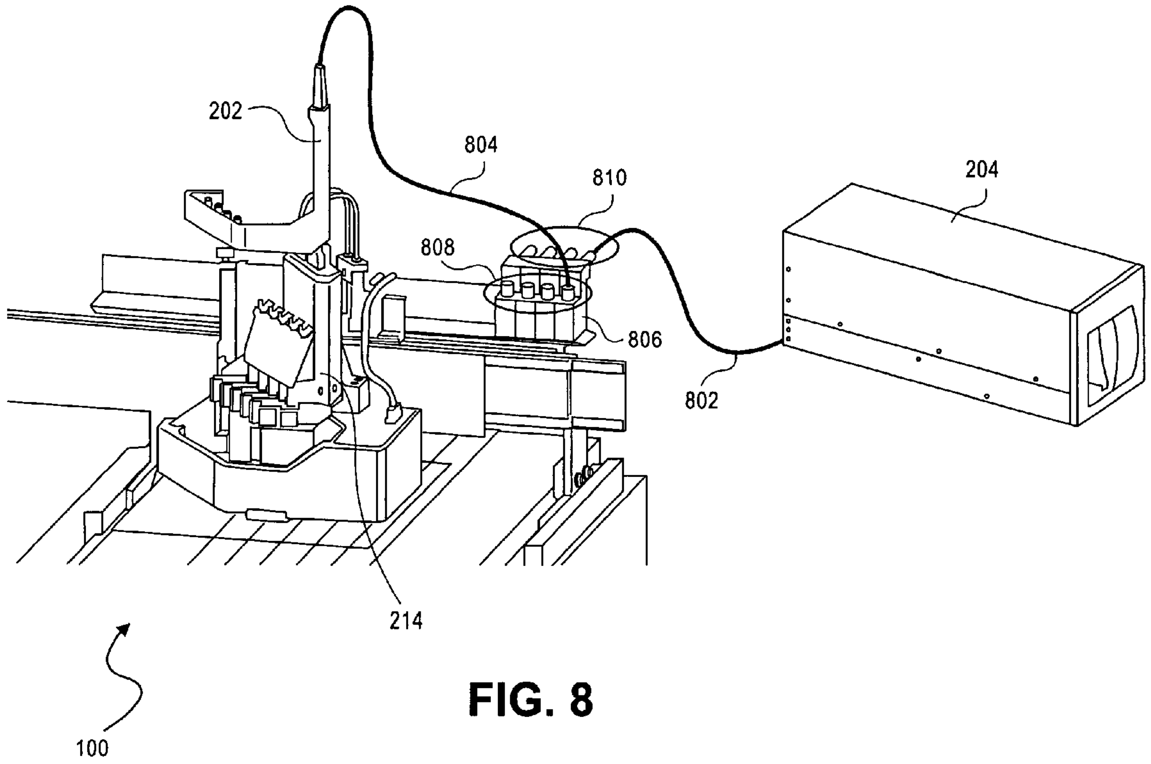
FIG. 8 is a diagram of a particular implementation of the fluid-ejection device of FIG. 1, in which there is a manifold to allow for easy switching among different fluid-delivery mechanisms, according to an embodiment of the invention.

FIG. 8 shows another particular implementation of the fluid-ejection device 100, according to an embodiment of the invention. Besides the bracket 202, the image-formation mechanism 214, and the fluid-supply station 204, the fluid-ejection device of FIG. 8 includes a manifold 806, with one conduit 804 fluidly coupling the bracket 202 to a connection point of the manifold 806, and another conduit 802 fluidly coupling the fluid-supply station 204 to a corresponding connection point of the manifold 806. The manifold 806 in general allows for a number of fluid-supply stations to be connected to connection points 810 thereof, and a number of brackets to be connected to corresponding connection points 808 thereof. Each of the connection points 810 fluidly connects to a corresponding one of the connection points 808.

The manifold 806 enables the bracket 202 to be disconnectable from the fluid-supply station 204, and enables the image-formation mechanism 214 to be easily connected to different types of fluids. As depicted in FIG. 8, the bracket 202 is connected to one of the connection points 808 of the manifold 806 that corresponds to the one of the connection points 810 of the manifold 806 to which the fluid-supply station 204 is connected. If the fluid-supply station 204 becomes inoperative, a different fluid-supply station providing the same type of fluid can be substituted for the fluid-supply station 204, by removing the conduit 802 from the manifold 806 and connecting a conduit fluidly connected to the new fluid-supply station to the manifold 806. Such switching of fluid-supply stations is accomplished without affecting the connection of the bracket 202 to the manifold 806.

Furthermore, all of the connection points 810 of the manifold 806 may have different fluid-supply stations connected thereto. If a different type of fluid is desired to be used when forming images with the image-formation mechanism 214, the current bracket attached to the mechanism 214 is removed. In FIG. 8 in particular, the bracket 202 is depicted as having been removed from the image-formation mechanism 214. Another bracket is attached to the mechanism 214, and to the one of the connection points 808 of the manifold 806 corresponding to the one of the connection points 810 of the manifold 806 to which a fluid-supply station supplying the desired fluid is connected. Fluid-ejection printheads within the image-formation mechanism 214 are also changed or cleaned.

Figure 9:
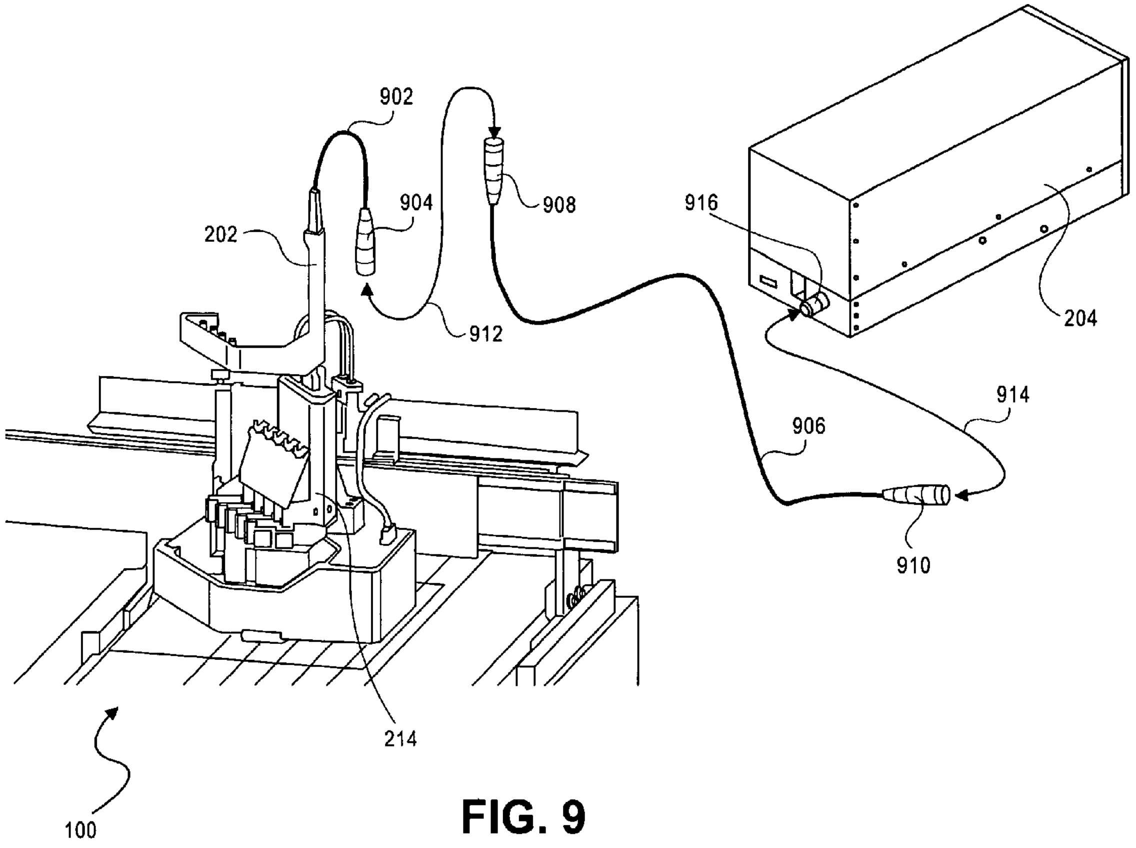
FIG. 9 is a diagram of a particular implementation of the fluid-ejection device of FIG. 1, in which the conduit between a bracket and a fluid-supply station of the fluid-delivery mechanism is disconnectable, according to an embodiment of the invention.

FIG. 9 shows another particular implementation of the fluid-ejection device 100, according to an embodiment of the invention. The fluid-ejection device 100 of FIG. 9 again includes the image-formation mechanism 214, a bracket 202 that is depicted as having been removed from the mechanism 214, and the fluid-supply station 204. The fluid-supply station 204 is removably connectable to the bracket 202. In particular, a conduit segment 902 fluidly connected to the bracket 202 ends in a connector 904. The connector 904 is capable of fluidly connecting with a corresponding connector 908 of a conduit 906, as indicated by the bi-directional arrow 912. The conduit 906 includes another connector 910, which is capable of fluidly connecting to a connector 916 of the fluid-supply station 204, as indicated by the bi-directional arrow 914. Utilizing the conduit 916 thus allows the bracket 202 to be removably connectable to the bracket 202.

Figure 10:
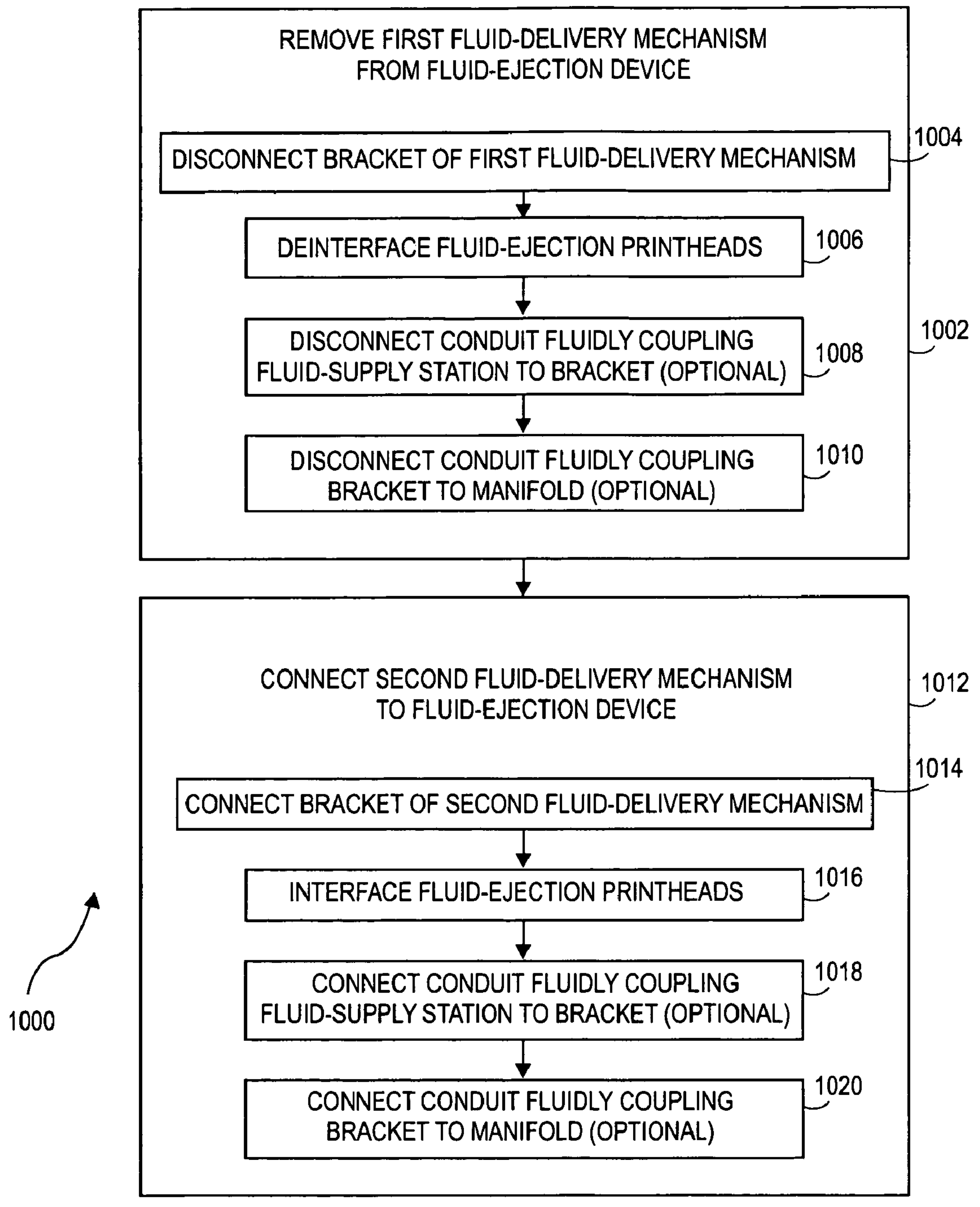
FIG. 10 is a flowchart of a representative method of use of a fluid-ejection device, specifically replacing a first fluid-delivery mechanism with a second fluid-delivery mechanism without contaminating other components of the device, according to an embodiment of the invention.

FIG. 10 shows a method of use 1000 with respect to the fluid-ejection device 100 that has been described, according to an embodiment of the invention. In particular, the method 1000 is for replacing a first fluid-delivery mechanism of the device 100 with a second fluid-delivery mechanism of the device 100. The first fluid-delivery mechanism is removed from the fluid-ejection device 100 (1002). This can include disconnecting the bracket of the first fluid-delivery mechanism from the image-formation mechanism of the fluid-ejection device 100 (1004), and deinterfacing, such as removing, the fluid-ejection printheads from the bracket (1006). In the embodiment of the fluid-ejection device 100 described in relation to FIG. 9, the conduit 906 fluidly coupling the fluid-supply station to the bracket may also be disconnected from either the fluid-supply station or the bracket (1008). In the embodiment of the fluid-ejection device 100 described in relation to FIG. 8, the conduit 804 fluidly connected to the bracket may be disconnected from the manifold 806 (1010).

Next, the second fluid-delivery mechanism is fluidly connected to the fluid-ejection device 100 (1014). This can include connecting the bracket of the second fluid-delivery mechanism to the image-formation mechanism of the fluid-ejection device 100 (1014), and interfacing, such as inserting, the fluid-ejection printheads to the bracket (1016). In the embodiment of the fluid-ejection device 100 described in relation to FIG. 9, the conduit 906 to fluidly couple the fluid-supply station to the bracket is connected to both the fluid-supply station and the bracket (1018). In the embodiment of the fluid-ejection device 100 described in relation to FIG. 8, the conduit 804 fluidly connected to the bracket is connected to the manifold 806 (1020).

It is noted that, although specific embodiments have been illustrated and described herein, it will be appreciated by those of ordinary skill in the art that any arrangement is calculated to achieve the same purpose may be substituted for the specific embodiments shown. This application is intended to cover any adaptations or variations of the present invention. Therefore, it is manifestly intended that this invention be limited only by the claims and equivalents thereof.

We claim:

1. A fluid-delivery mechanism for a fluid-ejection device comprising:

a fluid-supply station comprising a supply of fluid; and, a bracket fluidly and removably connectable between the fluid-supply station and one or more fluid-ejection printheads insertable into and controllable by the fluid-ejection device, the bracket to supply fluid from the fluid-supply station to the fluid-ejection printheads for image formation via fluid ejection, wherein the bracket is connected to the fluid-ejection printheads during image formation, wherein the bracket is removable from the fluid-ejection device, wherein the fluid-supply station is located external to the fluid-ejection device, and wherein the bracket comes into contact with the fluid.

2. The fluid-delivery mechanism of claim 1, wherein the bracket comprises at least one septum, each septum receptive to a corresponding needle of one of the fluid-ejection printheads to puncture the septum to enable fluid to flow therethrough.

3. The fluid-delivery mechanism of claim 1, further comprising the one or more fluid-ejection printheads, such that the bracket enables the fluid-ejection printheads to utilize the fluid for image formation without any part of the fluid-ejection device coming into contact with the fluid other than the fluid-delivery mechanism.

4. The fluid-delivery mechanism of claim 1, further comprising a conduit to fluidly connect the fluid-supply station to the bracket.

5. The fluid-delivery mechanism of claim 4, wherein the conduit is removably connectable between the fluid-supply station and the bracket.

6. The fluid-delivery mechanism of claim 1, further comprising an enclosure in which the fluid-supply station is encased separate from the bracket.

7. The fluid-delivery mechanism of claim 1, wherein the fluid-supply station comprises:

an ink stall receptive to the supply of fluid;

at least one air valve and at least one fluid valve fluidly connected to the supply of fluid via the ink stall;

a manifold fluidly connecting the bracket to the supply of fluid via the at least one fluid valve;

a pump to pump air through the at least one air valve to force fluid from the supply of fluid, through the at least one fluid valve and the manifold, to the bracket; and, a controller to control the pump, the at least one air valve, and the at least one fluid valve.

8. A fluid-delivery mechanism for a fluid-ejection device comprising:

a fluid-supply station comprising a supply of fluid; and, a bracket fluidly and removably connectable between the fluid-supply station and one or more fluid-ejection printheads insertable into and controllable by the fluid-ejection device, the bracket to supply fluid from the fluid-supply station to the fluid-ejection printheads for image formation via fluid ejection, wherein the bracket is connected to the fluid-ejection printheads during image formation, wherein the fluid-supply station is located external to the fluid-ejection device, and wherein the bracket comes into contact with the fluid.

* * * * *